US008820039B2

(12) United States Patent
Werning

(10) Patent No.: US 8,820,039 B2
(45) Date of Patent: Sep. 2, 2014

(54) CORNHEAD CROP LOSS DETECTION

(75) Inventor: Joshua D. Werning, Mount Wolf, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/594,933

(22) Filed: Aug. 27, 2012

(65) Prior Publication Data

US 2014/0053524 A1 Feb. 27, 2014

(51) Int. Cl.
*A01D 45/02* (2006.01)
*A01D 45/10* (2006.01)

(52) U.S. Cl.
USPC .................................. 56/62; 460/5

(58) Field of Classification Search
USPC ........ 56/62, 60, 103, 104, 105, 107; 460/1, 5; 340/684
See application file for complete search history.

(56) References Cited

U.S. PATENT DOCUMENTS

| | | | | |
|---|---|---|---|---|
| 2,604,749 | A | * | 7/1952 | Fergason ......................... 56/103 |
| 2,618,113 | A | * | 11/1952 | Hyman ............................ 56/104 |
| 3,101,579 | A | * | 8/1963 | Karlsson et al. ................ 56/105 |
| 3,126,690 | A | * | 3/1964 | Keller et al. ..................... 56/107 |
| 3,262,255 | A | * | 7/1966 | Karlsson et al. ................ 56/107 |
| 3,271,940 | A | * | 9/1966 | Ashton et al. ................... 56/105 |
| 3,610,252 | A | | 10/1971 | Coene et al. |
| 3,707,833 | A | * | 1/1973 | Sutton ............................. 56/104 |
| 3,858,384 | A | * | 1/1975 | Maiste et al. ................... 56/14.2 |
| RE31,064 | E | * | 10/1982 | Shriver ............................ 56/98 |
| 4,490,964 | A | | 1/1985 | Eldredge |
| 4,540,003 | A | | 9/1985 | Osselaere |
| 5,015,997 | A | | 5/1991 | Strubbe |
| 5,046,362 | A | | 9/1991 | Strubbe |
| 5,060,464 | A | * | 10/1991 | Caron ............................. 56/62 |
| 5,680,750 | A | * | 10/1997 | Stefl ............................... 56/62 |
| 5,878,559 | A | * | 3/1999 | Cooksey et al. ................. 56/62 |
| 6,226,969 | B1 | * | 5/2001 | Becker ............................ 56/62 |
| 6,237,312 | B1 | * | 5/2001 | Becker ............................ 56/62 |
| 6,342,006 | B1 | | 1/2002 | Bauch et al. |
| 6,475,082 | B2 | | 11/2002 | Visagie |
| 6,591,145 | B1 | * | 7/2003 | Hoskinson et al. ............ 700/28 |
| 6,839,616 | B2 | | 1/2005 | Beck |
| 7,001,267 | B2 | * | 2/2006 | Behnke et al. ................... 460/6 |
| 7,584,663 | B2 | | 9/2009 | Missotten et al. |
| 7,670,218 | B2 | | 3/2010 | Behnke et al. |
| 8,196,380 | B2 | * | 6/2012 | Carboni .......................... 56/62 |
| 2004/0186597 | A1 | | 9/2004 | Wippersteg et al. |
| 2009/0036184 | A1 | | 2/2009 | Craessaerts et al. |
| 2011/0146218 | A1 | * | 6/2011 | Carboni .......................... 56/62 |
| 2011/0173942 | A1 | * | 7/2011 | Kowalchuk ..................... 56/62 |
| 2012/0029757 | A1 | * | 2/2012 | Kowalchuk ................... 701/29 |

* cited by examiner

*Primary Examiner* — Árpád Fábián-Kovács
(74) *Attorney, Agent, or Firm* — Patrick M. Sheldrake; Seyed V. Sharifi T.

(57) ABSTRACT

A cornhead row unit including first and second longitudinally extending stripper plates mounted on a frame and having opposed stripping edges which define a gap between them. The frame further includes an adjusting arrangement operatively connecting the frame and at least one of the first and second stripper plates to selectably and transversely move at least one of the first stripper plate and second stripper plate with respect to the other stripper plate to vary the width of the gap. A loss detection device is operatively connected to the frame for permitting measurement of corn kernels lost as a result of drawing corn stalks through the gap to separate corn ears from the stalks.

20 Claims, 4 Drawing Sheets

CORNHEAD CROP LOSS DETECTION

FIELD OF THE INVENTION

The invention relates in general to agricultural combines. It relates particularly to a corn harvesting header assembly having row units for use with an agricultural combine.

BACKGROUND OF THE INVENTION

A corn harvesting header assembly or cornhead for an agricultural combine typically comprises a series of row units which are identical to each other. Each row unit includes a pair of snapping rolls having a snapping slot formed between them. Gathering chains having gathering fingers guide corn stalks into the snapping slot. The snapping rolls pull the corn stalks through the snapping slot and the ears are removed from the stalks as they come into engagement with opposed edges of stripper plates which bracket the slot between the gathering chains and the snapping rolls.

It is conventional for at least one of the two stripper plates to be mounted on the row unit frame for movement toward and away from the other plate. This movement permits the gap between the opposed stripping edges to be varied to accommodate different corn crops and crop conditions. Adjustment of the gap is typically accomplished by an adjusting mechanism including an actuation lever coupled to the adjustable stripper plate.

Despite having the adjusting mechanism, ears of corn can be susceptible to "butt" shelling. Butt shelling refers to the amount of corn kernels shelled from the ends of ears of corn as the corn ears are removed from their respective corn stalks. Although the loss of corn kernels is undesirable, it is unfortunately becoming a more prevalent characteristic of developing corn varieties. Operators must balance the loss of corn kernels associated with shelling with suitable harvesting capacity. Making matters worse, while the lost corn kernels can be viewed from the operator cab, the operator cannot objectively measure the amount and/or rate of lost corn kernels. Therefore, the operator's adjustments are based on guessing.

Therefore a cornhead row unit providing an objective measurement of corn kernels lost during shelling would be highly desirable.

Other features and advantages of the present invention will be apparent from the following more detailed description of the preferred embodiment, taken in conjunction with the accompanying drawings which illustrate, by way of example, the principles of the invention.

SUMMARY OF THE INVENTION

The present invention relates to a cornhead row unit including first and second longitudinally extending stripper plates mounted on a frame and having opposed stripping edges which define a gap between them. The frame further includes an adjusting arrangement operatively connecting the frame and at least one of the first and second stripper plates to selectably and transversely move at least one of the first stripper plate and second stripper plate with respect to the other stripper plate to vary the width of the gap. A loss detection device is operatively connected to the frame for permitting measurement of corn kernels lost as a result of drawing corn stalks through the gap to separate corn ears from the stalks.

The present invention further relates to a harvester including a cornhead row unit including first and second longitudinally extending stripper plates mounted on a frame and having opposed stripping edges which define a gap between them. The frame further including an adjusting arrangement operatively connecting the frame and at least one of the first and second stripper plates to selectably and transversely move at least one of the first stripper plate and the second stripper plate with respect to the other stripper plate to vary the width of the gap. A loss detection device is operatively connected to the frame for permitting measurement of corn kernels lost as a result of drawing corn stalks through the gap to separate corn ears from the stalks.

The present invention yet further relates to a method for reducing a loss of corn kernels associated with corn shelling by a harvester. The method includes providing a cornhead row unit comprising first and second longitudinally extending stripper plates mounted on a frame and having opposed stripping edges which define a gap between them. The method further includes providing an adjusting arrangement operatively connecting the frame and at least one of the first and second stripper plates to selectably and transversely move at least one of the first stripper plate and the second stripper plate with respect to the other stripper plate to vary the width of the gap. The method further includes shelling corn by drawing corn stalks through the gap to separate corn ears from corn stalks and detecting the amount of lost corn kernels associated with shelling corn. The method further includes actuating the adjusting arrangement to vary the width of the gap between the first and second stripper plates.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
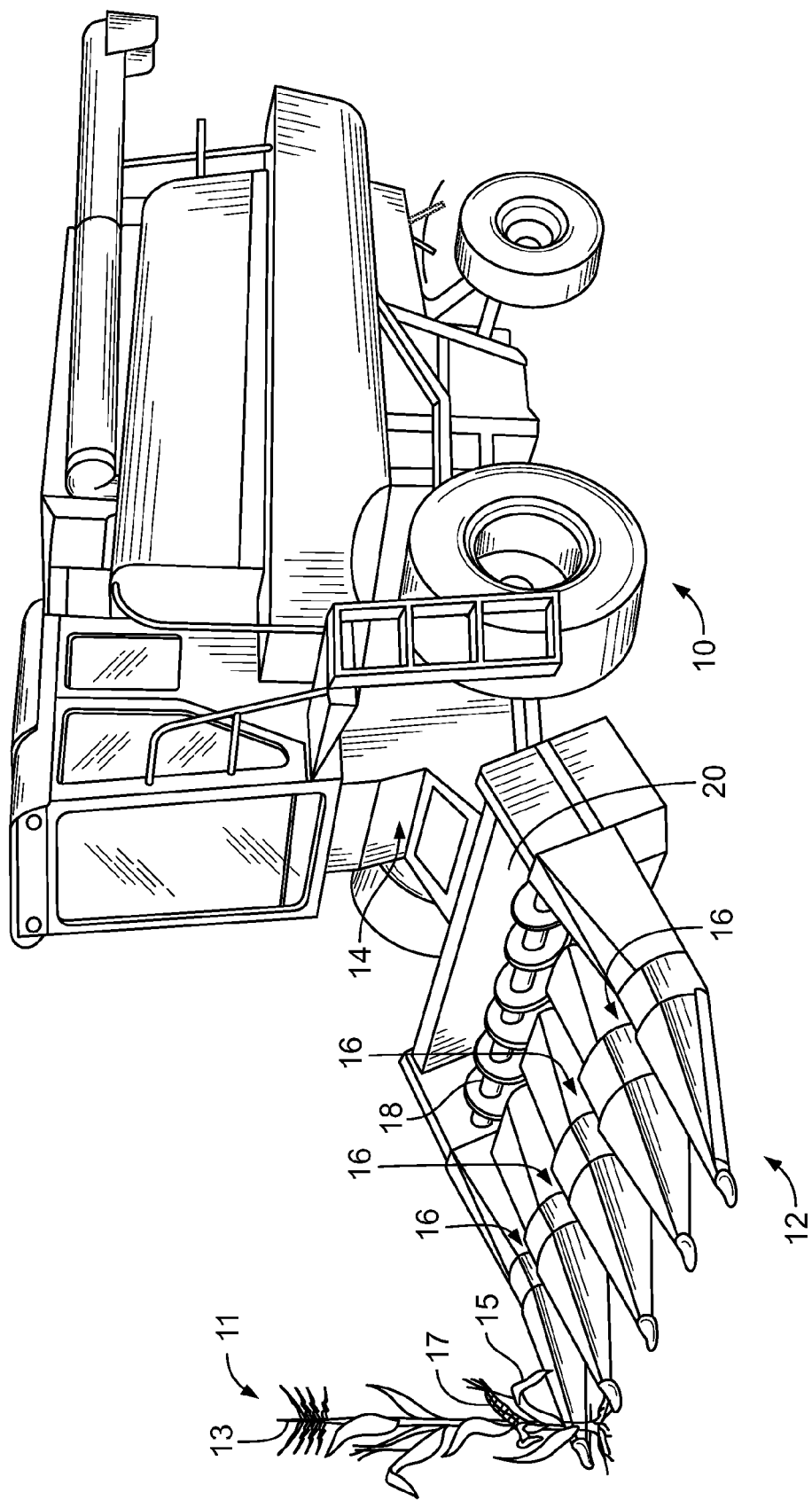
FIG. 1 is a front-side perspective view of an agricultural combine mounting a corn harvesting header assembly.

Referring now to the drawings, and particularly to FIG. 1, an agricultural combine of generally conventional construction is seen at 10. A corn harvesting header assembly, header assembly or cornhead 12 is mounted on combine 10, cantilevered in front of combine 10 and connected to the combine by a feeder assembly 14.

As shown, header assembly 12 illustrated contains four row units 16, which harvest four rows of corn simultaneously. In other embodiments, the number of rows of corn that may be harvested may be different than four. An exemplary corn plant 11 having a corn stalk 13 and ears of corn or corn ears 15 having corn kernels 17 is shown. The ears of corn are stripped from each of the four rows by a row unit 16 and then carried by an auger 18 in a trough 20 of a header assembly 12 to a feeder assembly 14. Feeder assembly 14 carries the collected corn ears rearwardly and upwardly into a threshing assembly (not shown) in the body of combine 10.

Figure 2:
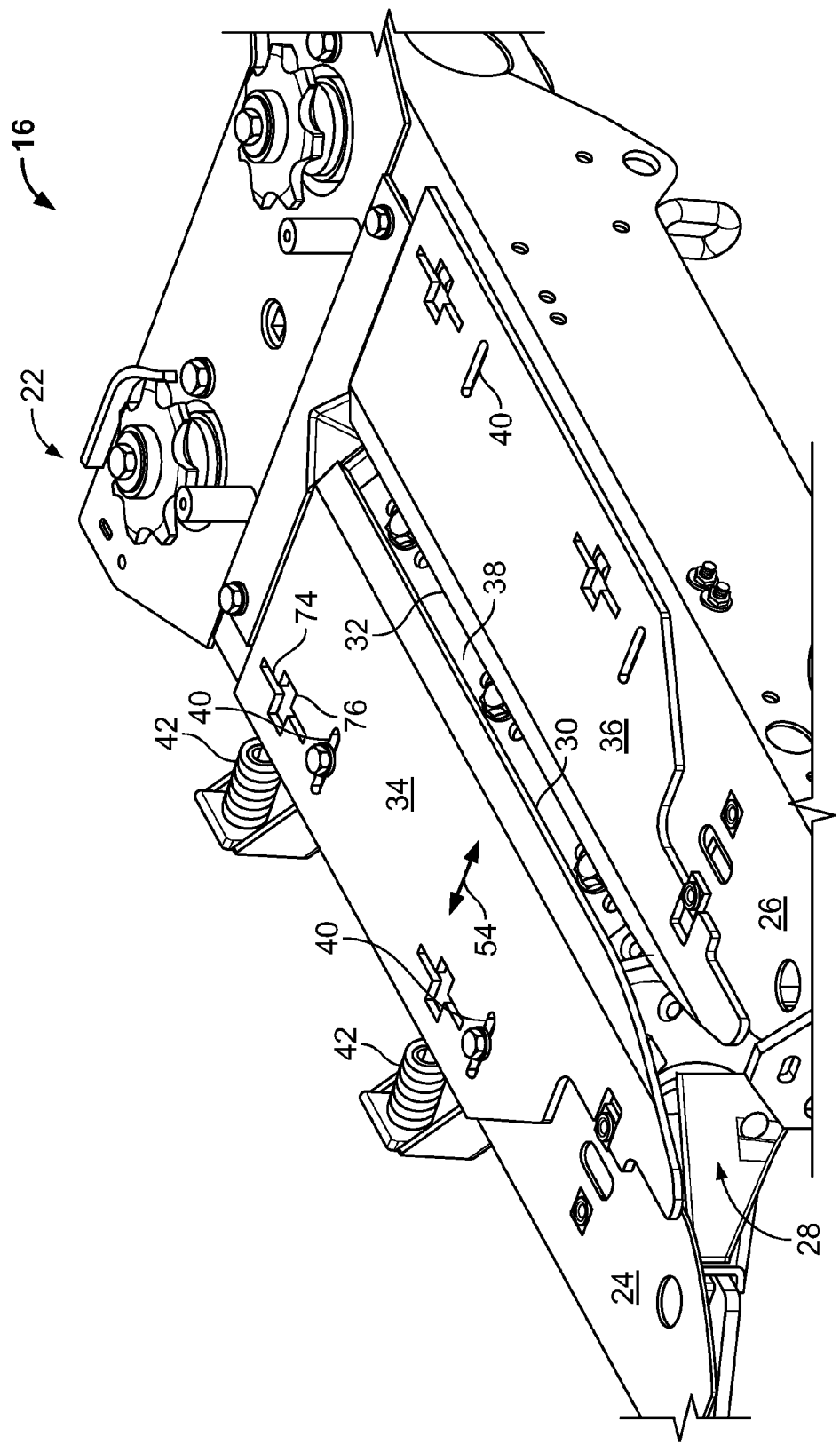
FIG. 2 is a top-front-side perspective view of a row unit in the corn harvesting header assembly of FIG. 1, the row unit incorporating a stripper plate adjustment mechanism embodying features of the present invention.
Figure 3:
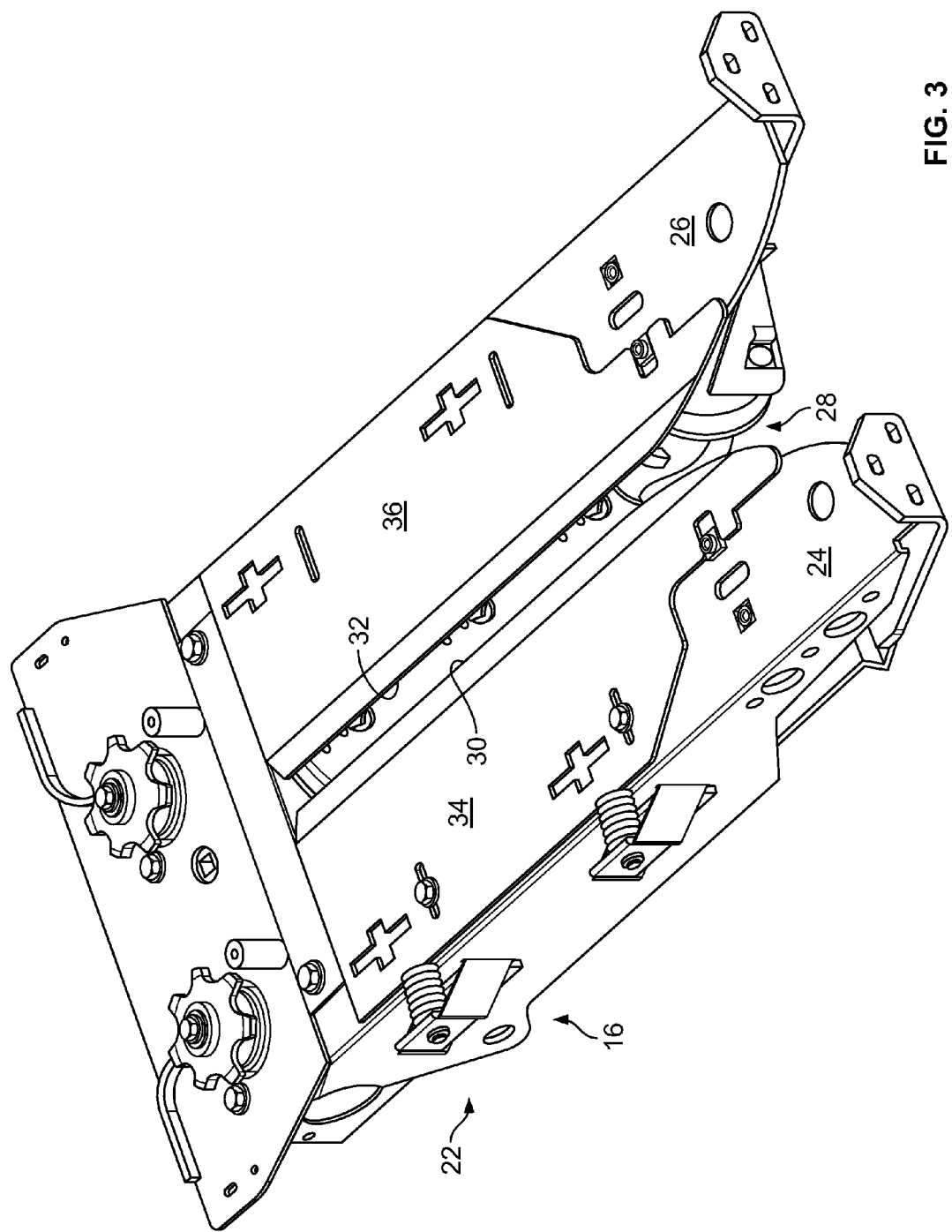
FIG. 3 is a reverse top-front-side perspective view of a row unit in the corn harvesting header assembly of FIG. 2 of the present invention.

Referring collectively to FIGS. 2 and 3, a row unit 16 is shown removed from header assembly 12. Row unit 16 gathers corn stalks 13 (not shown) as the row unit moves forwardly along a row of corn.

Each row unit 16 comprises a U-shaped frame 22 having legs 24, 26 on which each leg 24, 26 a gathering chain assembly (not shown) is mounted for endless circulation in paths parallel to each other. See U.S. Pat. No. 6,237,342, filed Sep. 19, 2002 (Becker), which is incorporated by reference in its entirety. The gathering chain assemblies each of which includes a series of gathering fingers (not shown) are designed to draw the stalks 13 (not shown) into a gap 28 defined between opposed edges 30, 32 of plates or stripper plates 34, 36, respectively. Snapping rolls 38 (FIG. 4) beneath stripper plates 34, 36 draw or pull the corn stalks downwardly through gap 28 and the ears of corn 15 (not shown) are stripped off of the stalks by plates edges 30, 32 as the stalks are pulled downwardly between them.

The gathering fingers of the gathering chain assembly (not shown) carry the stripped ears of corn rearwardly into trough 20. There the ears of corn are deposited and conveyed by auger 18 to feeder assembly 14. The stripped corn stalks are pulled through row unit 16 as feeder assembly 14 moves on through the field, with the stalks being left in the field.

In an exemplary embodiment, stripper plates 34, 36 are of substantially identical construction. Their opposed edged 30, 32, respectively, define gap 28. Stripper plate 34 is bolted through slots 40 in leg 24 of U-shaped frame 22. The bolted or otherwise mechanically-fastened connections through respective slots 40 of plate 34 permit plate 34 to move in a substantially transverse direction relative to leg 24, such as in a direction 54. Edge 30 of plate 34 is urged toward edge 32 of plate 36 by an adjusting arrangement 42, such as springs. In another embodiment, adjusting arrangement 42 for urging movement of at least one of edges 30, 32 of respective plates 34, 36 in transverse direction 54 toward and/or away from each other can be powered by hydraulics, mechanical linkages, electrical devices or other suitable apparatus as is well known. It is to be understood that the fluid ram may be in fluid communication with a fluid system operating at an adjustable pressure level that is capable of providing a range of forces as required by the field conditions. In one embodiment the fluid system pressure level may be controlled remotely from plates 34, 36, such as the combine cab, for convenience of the operator.

Figure 4:
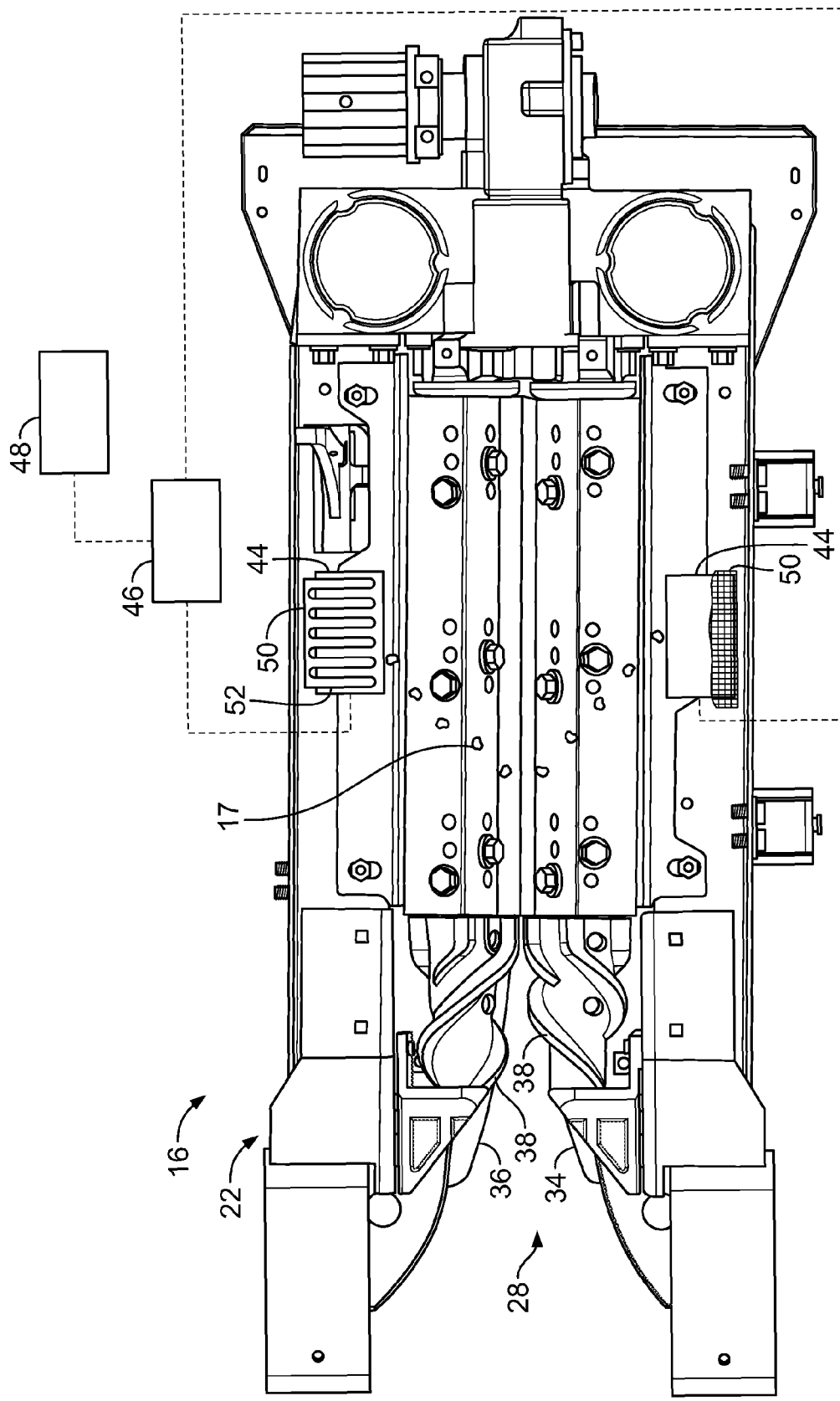
FIG. 4 is a bottom view of the row unit of FIG. 2 of the present invention.

As shown in FIG. 4, which is a bottom view of FIG. 2, row unit 16 includes a loss detection device 44 operatively connected to frame 22. Loss detection device 44 is usable for measuring and indicating a loss of corn kernels 17 (FIG. 1) as a result of "butt shelling" of corn kernels associated with shelling corn ears. Shelling corn ears is achieved by snapping rolls 38 pulling or drawing cornstalks 13 through gap 28 to separate corn ears 15 from the corn stalks 13 (FIG. 1). As shown, loss detection device 44 is positioned beneath frame 22. In one embodiment, loss detection device 44 may be located at positions other than beneath frame 22, including any location on the row unit (i.e., operatively connected to the frame) that permit contact with corn kernels separated from the corn ears during corn shelling. In other words, it is to be understood that for purposes of locating or mounting the loss detection device, the terms frame or row unit may be used interchangeably. Loss detection device 44 is configured to generate a signal, such as an output voltage, that is conveyed to and received by a processor 46, in response to contact with corn kernels 17 lost as a result of separating the ears of corn from the cornstalks. In one embodiment, loss detection device 44 and processor 46 may have a wireless connection. The lost corn kernels may strike or contact loss detection device 44 directly or indirectly after striking or contacting the field surface and then striking or contacting the device.

It is to be understood that the term lost corn kernels or loss of corn kernels or the like is intended to refer to corn kernels separated from ears of corn during shelling of the corn by the row units in a manner as previously described.

As further shown in FIG. 4, processor 46 is operatively connected to operator notification device 48. In one embodiment, processor 46 and operator notification device 48 may have a wireless connection. Operator notification device 48 alerts the operator of a magnitude of lost corn kernels by providing a visual representation, such as displaying a number depicting a cone or other outline shape that is "filled in" or illuminated in proportion to the number of corn kernels contacting or striking loss detection device 44. In other embodiments, a row or multiple rows of illuminated bars or other shape or indicia may appear in proportion to the number of corn kernels contacting or striking loss detection device 44 or other visual effects that would quickly and easily convey to the operator a magnitude of lost corn kernels due to shelling of the corn. Alternately, operator notification device 48 may alert the operator by providing an audio representation or a tactile representation or combination thereof.

As further shown FIG. 4, loss detection device 44 includes a protective member 50, shown in FIG. 4 in a cutaway view, that permits corn kernels to contact loss detection device 44. In one embodiment, protective member 50 is porous to permit corn kernel contact with the loss detection device. In one embodiment, protective member 50 is a screen. In one embodiment the screen may have varying mesh sizes or define different shapes if desired. Protective member 50 is configured to permit contact with corn kernels while protecting protective member 50 from other objects that could strike and damage protective member 50. In another embodiment, protective member 50 has a substantially open profile. That is, protective member 50 can have protrusions 52 extending outwardly from each other, substantially without overlap. For example, in one embodiment, protective member 50 may resemble a comb.

In operation, loss detection device 44 detects or permits measurement of a loss of corn kernels as a result of corn shelling by row unit 16 as previously discussed. Loss detection device 44 generates a signal in response to contact with lost corn kernels, permitting detection and measurement of the amount of the lost corn kernels. In response to an operator being alerted such as by operator notification device 48, the operator may selectably control (increase or decrease) the gap between plates 34, 36 (FIG. 2), possibly in combination with a change in speed of the harvester, such that the amount of corn kernels lost as a result of corn shelling is reduced while permitting the operator the flexibility of monitoring and maintaining a predetermined harvesting capacity. Furthermore, loss detection device 44, in combination with processor 46 and operator notification device 48, permits the operator to monitor lost corn kernels as a result of corn shelling in response to changing field conditions and the like, while maintaining harvesting capacity.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A cornhead row unit comprising:
   first and second longitudinally extending stripper plates mounted on a frame and having opposed stripping edges which define a gap between them;
   the frame further comprising:
      an adjusting arrangement operatively connecting the frame and at least one of the first and second stripper plates to selectably and transversely move at least one of the first stripper plate and second stripper plate with respect to the other stripper plate to vary the width of the gap; and
      a loss detection device operatively connected to the frame for permitting measurement of corn kernels lost as a result of drawing corn stalks through the gap to separate corn ears from the stalks; the loss detection device measures loss before crop enters an agricultural machine that hosts the corn head unit.

2. The unit of claim 1, wherein the loss detection device is positioned beneath the frame.

3. The unit of claim 1, wherein the loss detection device generates a signal in response to contact with lost corn kernels.

4. The unit of claim 3, including a controller for receiving the signal.

5. The unit of claim 4, including an operator notification device for alerting the operator of a magnitude of lost corn kernels.

6. The unit of claim 5, wherein the operator notification device visually notifies the operator to the magnitude of lost corn kernels.

7. The unit of claim 5, wherein the operator notification device audibly notifies the operator to the magnitude of lost corn kernels.

8. The unit of claim 2, wherein the loss detection device includes a porous protective member configured for corn kernels to at least partially pass therethrough.

9. The unit of claim 8, wherein the protective member is a screen.

10. The unit of claim 8, wherein the protective member has a substantially open profile.

11. The unit of claim 10, wherein the protective member resembles a comb.

12. A harvester comprising:
   a cornhead row unit comprising:
      first and second longitudinally extending stripper plates mounted on a frame and having opposed stripping edges which define a gap between them;
      the frame further comprising:
         an adjusting arrangement operatively connecting the frame and at least one of the first and second stripper plates to selectably and transversely move at least one of the first stripper plate and the second stripper plate with respect to the other stripper plate to vary the width of the gap; and
         a loss detection device operatively connected to the frame for permitting measurement of corn kernels lost as a result of drawing corn stalks through the gap to separate corn ears from the stalks; the loss detection device operates before crop entrance into the harvester.

13. The harvester of claim 12, wherein the loss detection device is positioned beneath the frame.

14. The harvester of claim 12, wherein the loss detection device generates a signal in response to contact with lost corn kernels.

15. The harvester of claim 14, including a controller for receiving the signal.

16. The harvester of claim 15, including an operator notification device for alerting the operator of a magnitude of lost corn kernels.

17. The harvester of claim 16, wherein the operator notification device visually notifies the operator about the magnitude of lost corn kernels.

18. The harvester of claim 13, wherein the loss detection device includes a porous protective member configured for corn kernels to at least partially pass therethrough.

19. A method for reducing a loss of corn kernels associated with corn shelling by a harvester comprising:
   providing a cornhead row unit comprising first and second longitudinally extending stripper plates mounted on a frame and having opposed stripping edges which define a gap between them;
   providing an adjusting arrangement operatively connecting the frame and at least one of the first and second stripper plates to selectably and transversely move at least one of the first stripper plate and the second stripper plate with respect to the other stripper plate to vary the width of the gap;
   shelling corn by drawing corn stalks through the gap to separate corn ears from corn stalks;
   detecting the amount of lost corn kernels associated with shelling corn before the corn entering the harvester;
   actuating the adjusting arrangement to vary the width of the gap between the first and second stripper plates.

20. The method of claim 19, wherein detecting the amount of lost corn kernels comprises
   providing a loss detection device operatively connected to the frame;
   generating signals by the loss detection device as a result of contact with lost corn kernels;
   receiving signals generated by the loss detection device; and
   notifying an operator of a magnitude of lost corn kernels.

* * * * *